US009141571B2

(12) United States Patent
Subramaniyan et al.

(10) Patent No.: US 9,141,571 B2
(45) Date of Patent: Sep. 22, 2015

(54) PCI EXPRESS SWITCH WITH LOGICAL DEVICE CAPABILITY

(71) Applicant: PLX Technology, Inc., Sunnyvale, CA (US)

(72) Inventors: Nagarajan Subramaniyan, San Jose, CA (US); Jack Regula, Chapel Hill, NC (US); Jeffrey Michael Dodson, Portland, OR (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 468 days.

(21) Appl. No.: 13/624,781

(22) Filed: Sep. 21, 2012

(65) Prior Publication Data

US 2013/0024595 A1 Jan. 24, 2013

Related U.S. Application Data

(63) Continuation-in-part of application No. 12/979,904, filed on Dec. 28, 2010, now Pat. No. 8,521,941.

(51) Int. Cl.
*G06F 13/40* (2006.01)
*G06F 13/28* (2006.01)

(52) U.S. Cl.
CPC .............. *G06F 13/28* (2013.01); *G06F 13/404* (2013.01); *G06F 13/4022* (2013.01); *G06F 2213/0026* (2013.01)

(58) Field of Classification Search
CPC .............. G06F 13/404; G06F 13/4022; G06F 2213/0026
See application file for complete search history.

(56) References Cited

U.S. PATENT DOCUMENTS

| 6,735,642 | B2 * | 5/2004 | Kagan et al. ..................... 710/24 |
| 7,694,025 | B1 * | 4/2010 | Norrie ............................... 710/3 |
| 7,743,197 | B2 * | 6/2010 | Chavan et al. ................. 710/314 |
| 7,912,997 | B1 * | 3/2011 | Murray ........................... 710/22 |

(Continued)

FOREIGN PATENT DOCUMENTS

WO     WO 2009/120798      10/2009

OTHER PUBLICATIONS

Regula, Jack, "Using Non-transparent Bridging in PCI Express Systems", PLX Technology, Jun. 1, 2004.
Regula, Jack, "Using PCIe in a variety of multiprocessor system configurations", https://www.emdedded.com/Home/PrintView?contentItemId=4006788, Jan. 23, 2007.

(Continued)

*Primary Examiner* — Brian Misiura

(57) ABSTRACT

A PCIe switch implements a logical device for use by connected host systems. The logical device is created by logical device enabling software running on a host management system. The logical device is able to consolidate one or more physical devices or may be entirely software-based. Commands from the connected host are processed in the command and response queues in the host and are also reflected in shadow queues stored in the management system. A DMA engine associated with the connected host is set up to automatically trigger on queues in the connected (local) host. Commands are sent to the physical devices to complete the work and a completion signal is sent to the management software and a response to the work is sent directly to the connected host, which is not aware that the logical device is non-existent and is implemented by software in the management system.

23 Claims, 3 Drawing Sheets

(56) References Cited

U.S. PATENT DOCUMENTS

| | | |
|---|---|---|
| 7,934,033 B2 | 4/2011 | Malwankar et al. |
| 8,312,187 B2 | 11/2012 | Rodrigues et al. |
| 8,341,327 B2 | 12/2012 | Baba et al. |
| 2006/0242354 A1 | 10/2006 | Johnsen et al. |
| 2009/0268738 A1 | 10/2009 | Tchapda |
| 2012/0096192 A1 | 4/2012 | Tanaka et al. |
| 2012/0167085 A1 | 6/2012 | Subramaniyan et al. |

OTHER PUBLICATIONS

"Single Root I/O Virtualization and Sharing Specification Revision 1.0", PCI SIG, Sep. 11, 2007.

Search Report in EU Application No. 13185535.5, mailed Sep. 3, 2014.

* cited by examiner

PCI EXPRESS SWITCH WITH LOGICAL DEVICE CAPABILITY

CROSS-REFERENCE TO RELATED APPLICATION

This application is a Continuation-in-Part of and claims priority to co-pending U.S. patent application Ser. No. 12/979,904, entitled "MULTI-ROOT SHARING OF SINGLE-ROOT INPUT/OUTPUT VIRTUALIZATION," filed on Dec. 28, 2010, which is hereby incorporated by reference herein in its entirety and for all purposes.

BACKGROUND OF THE INVENTION

1. Field of the Invention

The present invention relates generally to switches and electronic communication. More specifically, the present invention relates to enabling a synthetic or logical device in an intelligent PCIe switch in order to consolidate functionality of multiple devices.

2. Description of the Related Art

Computer architectures have advanced greatly over the years. Lately it is becoming more and more commonplace for chip designers to include external data interfaces, such as Universal Serial Bus (USB) interface controllers into their motherboards. These interfaces are known as host controllers. The processor is typically then connected to the other components of the computer system via an input/output (I/O) interconnect system.

There are many different computer I/O interconnect standards available. One of the most popular over the years has been the peripheral component interconnect (PCI) standard. PCI allows the bus to act like a bridge, which isolates a local processor bus from the peripherals, allowing a Central Processing Unit (CPU) of the computer to connect to a host of IO devices through this interconnect.

Recently, a successor to PCI has been popularized, termed PCI Express (or, simply, PCIe). PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express switch fabric comprised of one or more switch devices (embodiments are also possible without switches, however). In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple switch devices can be connected to ports on the root complex or cascaded.

As an example, FIG. 1 is a block diagram depicting a normal shared IO architecture having a standard PCIe switch 102 controlled by management host 104 running switch management software. Switch 102 services one or more hosts, shown as connected host 106 and connected host 108 (also referred to as "local hosts"), for example servers, PCs, and other computing devices. Also connected to switch are one or more devices 110-116 that typically provide some type of function or service for the connected hosts. Within switch 102 are virtual devices 118-124. Virtual devices 118 and 120 are connected to connected host 106 and virtual devices 122 and 124 are connected to connected host 108. Some of these virtual devices have data paths to physical devices 110-114. The functionality and roles of virtual devices 118-124 are described in co-pending application U.S. patent application Ser. No. 12/979,904, entitled "MULTI-ROOT SHARING OF SINGLE-ROOT INPUT/OUTPUT VIRTUALIZATION," where a solution was described that used resource redirection methods when multiple hosts are connected using the non-transparent ports of a PCIe switch that supports shared I/O mechanisms.

It would be desirable to further enhance the functionality of the PCIe switch through use of DMA engines, address mapping and memory space redirection to consolidate functionality of physical devices connected to the switch. In addition, it would be desirable to enable synthetic NVMe end points for connected hosts for a set of SSD drives (or other storage device) with or without additional features such as RAID or to share a set of SSD/storage drives with several connected hosts. Finally, it would be beneficial to users of the switch if it enabled sharing scarce or expensive resources among multiple connected hosts by way of software and hardware assists even if the resources do not allow sharing natively.

SUMMARY OF THE INVENTION

One aspect of the invention is a method of enhancing the functionality of a PCI express switch by enabling operation of a non-existent, logical (or synthetic) device in the switch. The logical device is implemented by logical device software in a management system host that controls operations of the switch. The synthetic device is presented to a local host connected to the switch. Write operations within the local host are captured thereby enabling the management system to create a shadow copy of local host component queues. The local host loads a driver for the synthetic device. Writes that occur in the local host are reflected in the management system. Shadow queues are created on the management system that reflects command and response queues in the local host. A DMA engine associated with the local host port is set up to automatically trigger on queues in the local host.

DETAILED DESCRIPTION OF SPECIFIC EMBODIMENTS

Figure 1:
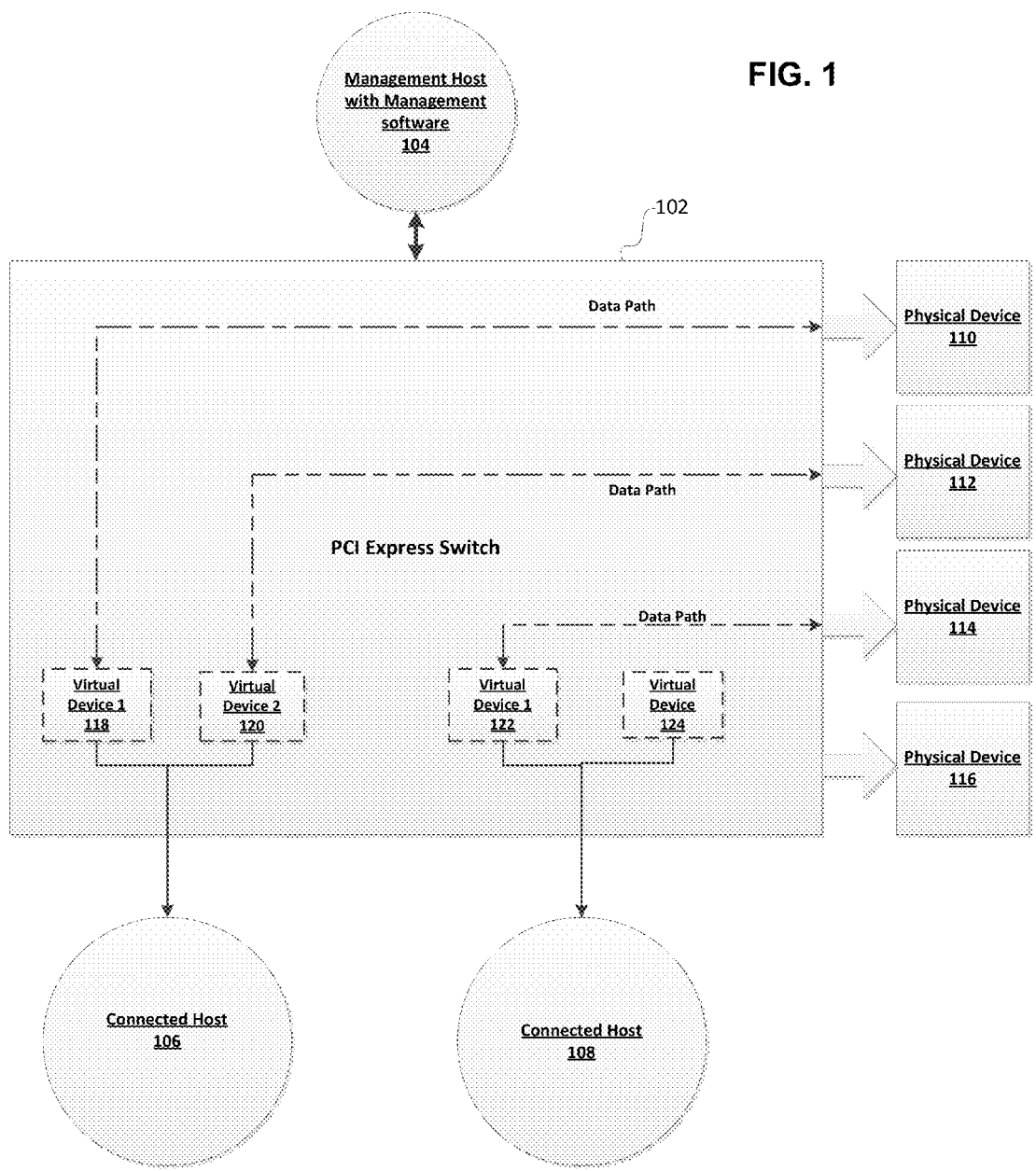
FIG. 1. is a block diagram depicting a normal shared IO architecture having a standard PCIe switch controlled by a system management host running switch management software.

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Methods and systems for consolidating physical devices into a logical device in a PCIe switch wherein the logical device is implemented using software in the switch management system are described in the various figures. Generally, any device driver model that uses a command queue and completion or response queue FIFO model with doorbells and interrupts for those FIFOs can be presented to connected hosts using the methods and systems described below. Before proceeding, it is useful to describe the basic components. One, as noted, is a FIFO model for input and output from a connected host driver to a DMA engine using the connected host memory. Another is the use of doorbells for the connected host driver to indicate to the hardware that new work has been added or is waiting. Interrupts are used for each completion or response queue for each completion queue for load balancing and indicating work completion. These features are present in some PCIe switches, such as the Capella 2 switch from PLX Technologies of Sunnyvale, Calif. The figures below describe the additional features needed by the innovative PCIe switch of the present invention. Provided first is an overview of these additional features.

In one embodiment there are automatic updates to queues/FIFO content in the management system when the connected host generates work by adding to its command queue. The DMA engine (part of the switch port) transfers the queued work request in the command queue automatically to the management system, also referred to as a consumer/consolidation system. Another feature is a direct data path from the physical devices to the connected host. While commands (control path) go through the management system (MCPU), the data path is allowed to go directly from the physical device to the connected host. This provides a significant performance benefit and improves latency by preventing a bottleneck at the management system. For example, typical devices (including SSD storage) will do DMA requests from the device to the connected host memory (either read or writes) and these will go directly from the physical device to the connected host. The connected host's requests initially go to the management system and the management system then redirects or issues equivalent commands to the individual devices (or drives). Another feature is address isolation and the ability to access different connected hosts from any physical device endpoint. This may be enabled through address mapping/trapping features of the hardware enabled by the management system software. To present a logical device to a connected host requires that the switch trap connected host I/O enumeration cycles and also answer them correctly using the logical device software in the management system.

In one embodiment of the present invention, a logical or non-existent device connected to a PCIe switch is presented or shown to a connected host (a host connected to the PCIe switch). The logical device does not physically exist (it is non-existent), thereby enabling connection of a fictitious device to a connected host at any time. The logical device is a synthetic I/O consolidation PCIe endpoint. This logical device provides a mechanism for consolidation of physical devices. The logical device may also be a pure software created device without it corresponding to any physical devices (i.e., there are no physical devices behind it). The logical device shows up as a PCIe endpoint or as a specific implementation or deployment, such as a RAID device. It uses specific software and hardware acceleration features of the PCIe switch.

Figure 2:
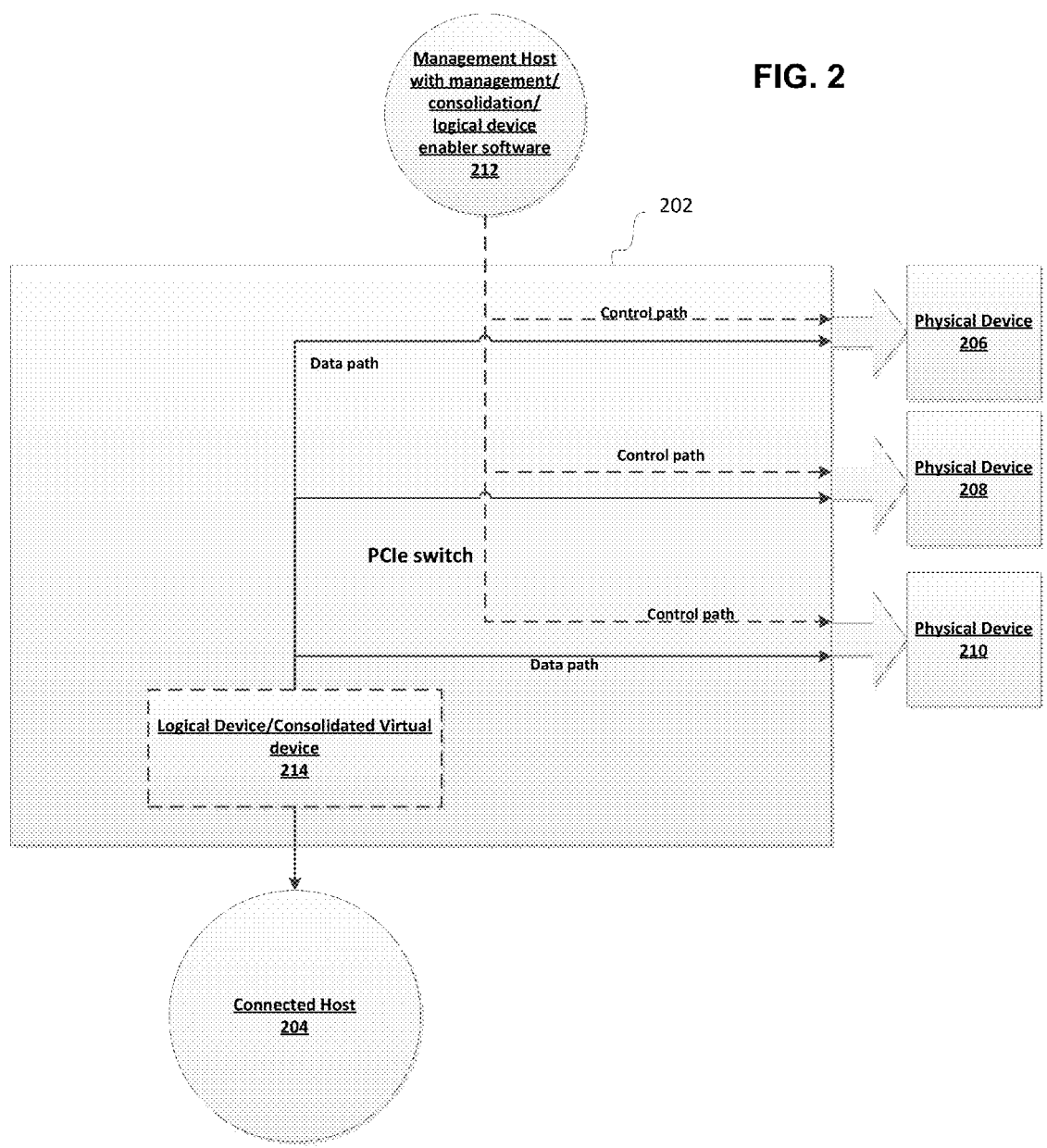
FIG. 2 is a block diagram depicting a PCIe switch having a logical device and a management host system with logical device enabling software in accordance with one embodiment.

FIG. 2 is a block diagram depicting a PCIe switch having a logical device and a management host system with logical device enabling software in accordance with one embodiment. Shown is an innovative PCIe switch 202 connected to a host 204 and three physical devices 206-210. A management system host 212 with logical device software and other necessary software for operating the management system is connected to switch 202. The logical device enabling software implements a logical device 214 (also referred to as a consolidated virtual device) shown by the dashed-line box. Logical device 214 operates virtually with connected host 204. It has data paths going to physical devices 206-210. Management system host 212 has control paths shown by the dashed lines to the physical devices 206-210 that implement logical device 214. These control paths are dashed to indicate that they essentially emanate from the logical device enabling software in management system 212 and are responsible for physically implementing logical (virtual) device 214.

In the various embodiments described below, one method of implementing the logical device to the PCIe switch utilizes DMA engines in a new capacity, address mapping and translation and configuration, and memory space and configuration space redirection features. For example, the address mapping may be needed so that Base Address Registers (BARs) in the logical device are mapped to the management memory by software in the host management system. In this manner, features of various physical devices are consolidated under one logical device. Another advantage is that if one physical device has an error or becomes disabled, then the logical device can still operate (e.g., the host system will not encounter a 'blue screen' scenario). Interrupt consolidation and generation is also possible, thereby easing the load on the host system. Without this consolidation, if there are 'n' physical devices, there may be as many as 'n' devices sending interrupts which in some cases may be overload for a connected host. Interrupts from one logical device would ease the workload of the host system. In another deployment scenario, the logical device can be an NVMe endpoint which may consolidate physical NVMe or non-NVMe storage devices (e.g., SATA drives, SSC drives).

The methods described in related applications describe how a physical device is presented to a host. As noted above, the present invention addresses presenting a logical, non-existent device to a host by mapping address spaces for the logical device into a host management system CPU. The logical device is also tied to a DMA engine, thus, when the device is presented to a host, the host is able to see only the logical device and not the DMA functions. Generally, if only the logical device is connected to the PCIe switch, a connected host will not see or be aware of the underlying DMA or non-transparent (NT), even though the DMA and NT functions are operating, but just not shown to the host.

The DMA engine is attached to queues and doorbells as explained below. Queues are allocated in host memory and written to the logical device. Queues are mapped into the host management system memory (FIFO). The DMA is then programmed to tie the queues in the logical device to host system memory queues. In addition, doorbells in the connected host may also be mapped to the host management system doorbell stack. As is known in the art, a device driver sends commands to a command queue in the device. There may be one or more command queues. The hardware performs operations on the data in the command queue and the results are stored in a response queue. As noted, the logical device has a FIFO for implementing these queues and a DMA engine is attached to them or is programmed to tie to the queues in the logical device.

When the connected host driver activates or "rings" the doorbell of the logical device (i.e., when the connected host wants to use a function provided by the logical device), the logical device DMA engine wakes up since it is tied to the logical device and more specifically is aware of the logical device command queue. The DMA engine transports this to management system interrupts. The work requested by the connected host is inserted in the queue and the process follows its normal course of operation.

The logical software on the host is able to perform the work without extraneous or additional software on the host. It can be done solely with hardware assistance.

The connected host driver writes operations to the device configuration space or BARs. Specifically, it will write to the device's registers in the BAR that are reflected in a shadow space in the host management system memory. As such, shadow copies of BARS are on the host management system. Thus, when there is a write to the BARs in the logical device, it is reflected in the management system.

The shadow memory in the host management system captures writes that are originally in the connected host. As is known in the art, when the connected host loads a driver, it starts using registers in the BAR which is specific to device that is presented. The driver begins operating, configuring commands, and bringing up the device. The PCIe switch re-directs all writes and commands into the management system. As noted all writes in the connected host will appear in the host management system shadow memory via the PCIe switch.

One step is setting up the data command and response queues on the local host memory. Commands for setting up or configuring the space (such as how many queues need to be supported, the number of logical disks, etc.) and other configuration questions may be answered or tended to by the logical software on the host management system. The driver configures the queues by allocating local system memory for the FIFO and writing base address and size to the hardware.

Figure 3:
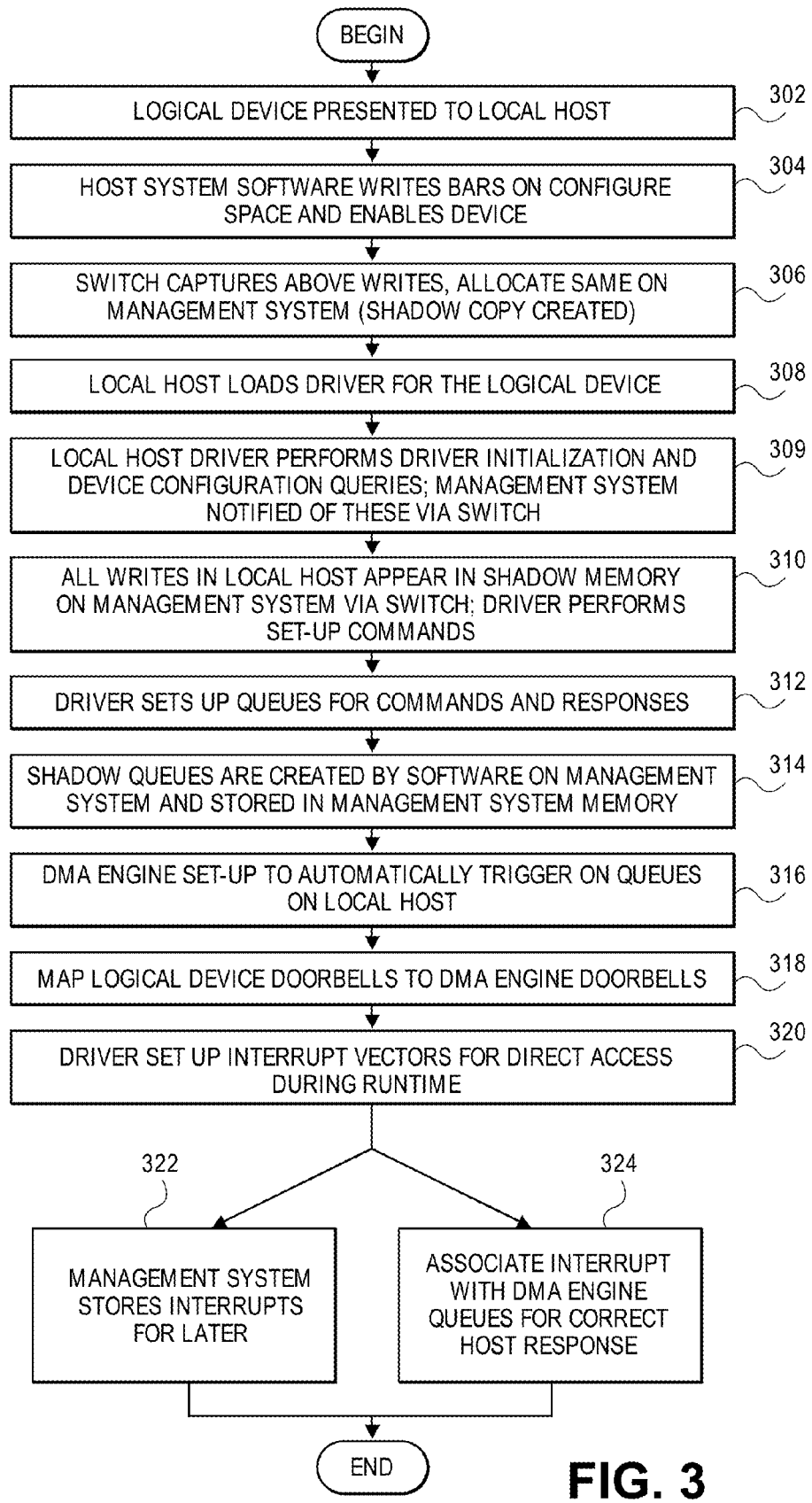
FIG. 3 is a flow diagram of a process of installing a synthetic or logical device on a PCIe switch in accordance with one embodiment.

FIG. 3 is a flow diagram of a process of installing a synthetic or logical device on a PCIe switch in accordance with one embodiment. At step 302 the synthetic device is presented on or shown to a local host connected to the switch. The local host (herein "host") enumerates devices on the PCIe by performing configuration cycles on a bus captured by the device. This is described in the parent patent application. At step 304 the host system software writes BARs on the configuration space and enables the logical device. At step 306 the switch captures the writes at step 304 thereby enabling the management system to build the same configuration as on the local host. It can allocate the same memory space so there is a one-to-one mapping within the BARs and memory space. Thus, there is now a shadow copy of the local host BAR in the management system.

At step 308 the local host loads a driver for the logical device. The management system is notified of the same operations via the switch. That is, when the local host writes something to the BARs in the host memory, these writes will be reflected in the shadow memory in the management system. At step 309 the local host driver performs driver initialization and device configuration queries. The management system is notified of these via the switch. At step 310 all writes in the local host appear in the shadow memory on the management system. The driver performs set-up commands.

At step 312 the driver sets up queues for commands and responses in the local host as it normally would. These FIFO queues for storing commands and responses are known in the art. At step 314 shadow queues are created by software on the management system and stored in memory. The queues in the local host are essentially mapped to the management system memory. At step 316 the DMA engine for the port of the local host is set up to automatically trigger on queues on the local host. That is, the DMA engine is programmed to tie the command queue in the local host to the command queue in the management system memory. This mapping is also done with the doorbells in the local host at step 218. Therefore, when the host driver rings the doorbell, the DMA wakes up (i.e., is automatically triggered).

At step 320 the local host driver sets up interrupt vectors and handlers on the local host. These interrupts are sent to the management system at which time one of two different actions may occur. At step 322 the management system stores the interrupt vectors for direct access during runtime. At step 324 the interrupt vector is associated with the DMA engine queues that will manage the local host response queues. At this stage the installation of the logical device on the PCIe switch is complete.

As described above, the logical device is implemented by software in the management system. It is this software that does work on the data and directs it to the physical device. When the physical device completes the function or work, a completion signal is sent to the management system which ordered the work via logical device software where the features of the physical device are consolidated. The response from the work is sent directly to the local host where it is stored in the response queue. This update to the local host response queue is still reflected in shadow memory of the management system.

The description herein provides a number of new features and improvements to existing PCIe switching technology. In one embodiment, hardware assists to enable I/O physical device consolidation is described, while adding or enabling value-added features using this consolidation. Separation and isolation of hot-plug events from the connected physical devices to the connected port through the use of a logical or synthetic endpoint in the connected host is described. There are also performance improvements by virtue of the consolidation and isolation of interrupts generated by connected physical devices to a connected host. Finally, it should be noted that the embodiments described above are extensible with software in the management system. There can be multiple hosts and physical devices (e.g., there can be 15 physical devices being shadowed by 5 connected hosts all connected to one PCIe switch).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method of enabling operation of a synthetic device in a PCIe switch, the method comprising:
    presenting the synthetic device to a local host component connected to the switch;
    capturing read and write operations within the local host, thereby enabling a management system of the switch to create a shadow copy of local host component queues;
    notifying the management system of local host driver operations, wherein the local host loads a driver;
    enabling writes that occur in the local host to be reflected in a memory on the management system;
    enabling creation of shadow queues on the management system, said shadow queues reflecting command and response queues in the local host;
    setting up a DMA engine associated with the local host port to automatically trigger on the queues in the local host;
    enabling mapping of synthetic device doorbells to DMA engine doorbells; and
    mapping addresses between the local host and the management system thereby enabling data transmission between the local host and a physical device associated with the synthetic device.

2. A method as recited in claim 1 further comprising:
    sending interrupt vectors on the local host to the management system.

3. A method as recited in claim 1 further comprising:
    associating interrupt vectors with DMA engine queues for appropriate host device response.

4. A method as recited in claim 1 wherein a plurality of local hosts and a plurality of physical devices use the synthetic device.

5. A method as recited in claim 1 wherein the management system has a synthetic device enablement module that provides executable instructions for implementing the synthetic device in the switch.

6. A method as recited in claim 1 wherein the management system has a shadow copy of the queues stored on the local host.

7. A method as recited in claim 1 wherein, when the physical device completes a function requested by the local host, a completion signal is sent to the management system and a response is sent directly to the local host.

8. A method as recited in claim 5 wherein the enablement module performs operations on data from the local host and directs the data to the physical device.

9. A method as recited in claim 1 wherein there is a control path between the management system and the physical device for transmitting commands relating to the synthetic device and a data path between the physical device and the local host.

10. A method as recited in claim 1 wherein there is a one-to-one mapping of updates to the queues in the local host that are reflected in the shadow queues in the management system.

11. A method as recited in claim 1 wherein the synthetic device is a software-created device without an associated physical device.

12. A method as recited in claim 1 further comprising
    allocating the queues in the local host and writing the queues to the synthetic device.

13. A PCI express switch in connection with a management system having a logical device enabler module for implementing a logical consolidation of physical devices in the switch,
    wherein the logical device enabler module presents the logical consolidation of physical devices to a connected host as a synthetic device,
    wherein the synthetic device is used by the connected host to write data to and read date from the physical devices, and
    wherein a memory in the management system that:
    stores shadow copies of a command queue, a response queue, and a doorbell as stored in the connected host;
    enables mapping of synthetic device doorbells to DMA engine doorbells of a DMA engine of the connected host; and
    enables mapping of addresses between the connected host and the management system to enable data transmission between the physical devices and the connected host.

14. A method of enabling operation of a synthetic device in a PCIe switch, the method comprising:
    presenting the synthetic device to a local host component connected to the switch;
    capturing read and write operations within the local host, thereby enabling a management system of the switch to create a shadow copy of local host component queues;
    notifying the management system of local host driver operations, wherein the local host loads a driver;
    enabling writes that occur in the local host to be reflected in a memory on the management system;
    enabling creation of shadow queues on the management system, said shadow queues reflecting command and response queues in the local host;
    setting up a DMA engine associated with the local host port to automatically trigger on the queues in the local host; and
    enabling mapping of synthetic device doorbells to DMA engine doorbells; and
    allocating the queues in the local host and writing the queues to the synthetic device.

15. A method as recited in claim 14 further comprising:
    sending interrupt vectors on the local host to the management system; and
    associating the interrupt vectors with DMA engine queues for appropriate host device response.

16. A method as recited in claim 14 wherein
    wherein the management system has a synthetic device enablement module that provides executable instructions for implementing the synthetic device in the switch and the enablement module performs operations on data from the local host and directs the data to the physical device.

17. A method as recited in claim 14 wherein there is a control path between the management system and the physical device for transmitting commands relating to the synthetic device and a data path between the physical device and the local host.

18. A method as recited in claim 14 wherein there is a one-to-one mapping of updates to queues in the local host that are reflected in the shadow queues in the management system.

19. A method as recited in claim 14 further comprising mapping addresses between the local host and the management system thereby enabling data transmission between the local host and a physical device associated with the synthetic device.

20. A method of enabling operation of a synthetic device in a PCIe switch, the method comprising:
    presenting the synthetic device to a local host component connected to the switch;
    capturing read and write operations within the local host, thereby enabling a management system of the switch to create a shadow copy of local host component queues;
    notifying the management system of local host driver operations, wherein the local host loads a driver;
    enabling writes that occur in the local host to be reflected in a memory on the management system;
    enabling creation of shadow queues on the management system, said shadow queues reflecting command and response queues in the local host;
    setting up a DMA engine associated with the local host port to automatically trigger on queues in the local host; and
    enabling mapping of synthetic device doorbells to DMA engine doorbells,
    wherein the synthetic device is a software-created device without an associated physical device.

21. A PCI express switch, comprising
    a management system operable to logically consolidate a plurality of physical devices into a synthetic device, to present the synthetic device to a host, and to allocate queues in the host for writing to the physical devices; and
    a memory operable to store shadow copies of the queues in the host,
    wherein the management system is further operable to map the queues in the host to the shadow copies of the queues in the memory, and to direct the host to DMA data from the host queues to the shadow copies of the queues to write data to the physical devices via the synthetic device.

22. The PCI express switch of claim 21, wherein:
    the synthetic device is operable to DMA data from the shadow copies of the queues in the memory to the host queues in response to a read operation by the host.

23. The PCI express switch of claim 22, wherein:
    the synthetic device is software executed operate on the data from the host to direct the data to the physical device.

* * * * *